US008426525B2

(12) United States Patent
Nozue et al.

(10) Patent No.: US 8,426,525 B2
(45) Date of Patent: *Apr. 23, 2013

(54) ETHYLENE BASED POLYMER COMPOSITION AND FILM

(75) Inventors: Yoshinobu Nozue, Ichihara (JP); Yasutoyo Kawashima, Ichihara (JP)

(73) Assignee: Sumitomo Chemical Company, Limited, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/599,069

(22) PCT Filed: May 15, 2008

(86) PCT No.: PCT/JP2008/059403
§ 371 (c)(1),
(2), (4) Date: Dec. 23, 2009

(87) PCT Pub. No.: WO2008/143306
PCT Pub. Date: Nov. 27, 2008

(65) Prior Publication Data
US 2010/0216947 A1 Aug. 26, 2010

(30) Foreign Application Priority Data
May 18, 2007 (JP) ................. 2007-132617

(51) Int. Cl.
C08L 23/00 (2006.01)
C08L 23/04 (2006.01)
(52) U.S. Cl.
USPC .......................... 525/240; 525/191
(58) Field of Classification Search ............. 525/191, 525/240
See application file for complete search history.

(56) References Cited

U.S. PATENT DOCUMENTS

| 5,594,071 | A | 1/1997 | Takahashi et al. |
| 5,663,236 | A | 9/1997 | Takahashi et al. |
| 6,225,410 | B1 | 5/2001 | Sugimura et al. |
| 8,076,418 | B2* | 12/2011 | Nozue et al. ............ 525/191 |
| 2001/0053831 | A1 | 12/2001 | Ohno et al. |
| 2002/0055592 | A1 | 5/2002 | Johoji et al. |
| 2003/0229182 | A1* | 12/2003 | Alarcon et al. ........... 525/191 |
| 2004/0210004 | A1 | 10/2004 | Takahashi et al. |
| 2006/0036039 | A1* | 2/2006 | Alarcon et al. ........... 525/191 |
| 2007/0083009 | A1* | 4/2007 | Chai ...................... 525/240 |
| 2007/0093627 | A1 | 4/2007 | Iseki et al. |
| 2007/0100106 | A1 | 5/2007 | Iseki et al. |

FOREIGN PATENT DOCUMENTS

| CN | 1939943 A | 4/2007 |
| JP | 59149941 A | 8/1984 |
| JP | 6065442 A | 3/1994 |
| JP | 6065443 A | 3/1994 |
| JP | 6207056 A | 7/1994 |
| JP | 08003382 A | 1/1996 |
| JP | 2000178383 A | 6/2000 |
| JP | 2002-155212 A | 5/2002 |
| JP | 2002-179856 A | 6/2002 |
| JP | 2002-294007 A | 10/2002 |
| JP | 2004-359911 A | 12/2004 |
| JP | 2006-161059 A | 6/2006 |
| JP | 2006274159 A | 10/2006 |
| JP | 2006274160 A | 10/2006 |
| JP | 2007-023229 A | 2/2007 |
| JP | 2007-051283 A | 3/2007 |
| WO | 98/06781 A1 | 2/1998 |

OTHER PUBLICATIONS

JP 200751283 Machine translation.*
JP 2007023229 Machine translation.*
Bremner et al., "Melt Flow Index Values and Molecular Weight Distributions of Commercial Thermoplastics," pp. 1617-1627, vol. 41, Journal of Applied Polymer Science, 1990.

* cited by examiner

Primary Examiner — Irina S Zemel
Assistant Examiner — Jeffrey Lenihan
(74) Attorney, Agent, or Firm — Sughrue Mion, PLLC

(57) ABSTRACT

An ethylene based polymer composition comprising the following component (A) and the following component (B) wherein the content of the component (B) is 0.5 to 20 parts by weight per 100 parts by weight of the component (A):
Component (A): an ethylene based polymer satisfying all of the following requirements (a1) to (a3):
(a1) the density is 890 to 925 kg/m$^3$,
(a2) the melt flow rate (MFR) is 0.1 to 10 g/10 minutes,
(a3) the flow activation energy (Ea) is 50 kJ/mol or more,
Component (B): an ethylene-α-olefin copolymer satisfying all of the following requirements (b1) to (b3):
(b1) the density is 890 to 925 kg/m$^3$,
(b2) the intrinsic viscosity [η] measured in a tetralin solution is 4 to 15 dL/g,
(b3) the flow activation energy (Ea) is less than 50 kJ/mol.

2 Claims, No Drawings

ETHYLENE BASED POLYMER COMPOSITION AND FILM

TECHNICAL FIELD

The present invention relates to an ethylene based polymer composition and a film.

BACKGROUND ART

As a film or sheet used for wrapping of foods, medicinal products, daily groceries and the like, molded articles obtained by extrusion-molding an ethylene based polymer are often used. Among ethylene based polymers, a linear copolymer composed of ethylene and α-olefin, so called linear low density polyethylene, is excellent in impact strength as compared with a high pressure low density polyethylene having long chain branch. Thus, a wrapping material composed of a linear low density polyethylene can be made thinner as compared with a wrapping material composed of a high pressure low density polyethylene.

However, as compared with a high pressure low density polyethylene, a linear low density polyethylene has lower melt tension, and manifests wrinkling of a film by vibration of a bubble in blown film molding, and increase in the distribution of a film thickness (hereinafter, there are referred to as moldability). Therefore, methods for improving moldability are investigated, and there is suggested a polymer composition obtained by blending 5 to 30% by weight of a high pressure low density polyethylene into a linear low density polyethylene (for example, Japanese Patent Publication of Examined Application (JP-B) No. 62-3177, Japanese Patent Application Laid-Open (JP-A) No. 11-181173). This polymer composition, however, shows lower strength as compared with a linear low density polyethylene, in some cases.

Recently, investigations of a polyethylene production catalyst have progressed, and it has been reported that an ethylene-α-olefin copolymer having long chain branch excellent in strength and moldability is obtained by polymerizing ethylene and α-olefin with a specific metallocene catalyst (for example, JP-A No. 2005-97481).

However, also the above-described ethylene-α-olefin copolymer having long chain branch is not sufficiently satisfactory in strength and moldability.

DISCLOSURE OF THE INVENTION

Under such conditions, a problem to be solved by the present invention is to provide an ethylene based polymer composition excellent in strength and moldability, and a film obtained by extrusion-molding the polymer composition.

In a first aspect, the present invention relates to an ethylene based polymer composition comprising the following component (A) and the following component (B) wherein the content of the component (B) is 0.5 to 20 parts by weight per 100 parts by weight of the component (A):

Component (A): an ethylene based polymer satisfying all of the following requirements (a1) to (a3):
  (a1) the density is 890 to 925 kg/m$^3$,
  (a2) the melt flow rate (MFR) is 0.1 to 10 g/10 minutes,
  (a3) the flow activation energy (Ea) is 50 kJ/mol or more,
  Component (B): an ethylene-α-olefin copolymer satisfying all of the following requirements (b1) to (b3):
  (b1) the density is 890 to 925 kg/m$^3$,
  (b2) the intrinsic viscosity [η] measured in a tetralin solution is 4 to 15 dL/g,
  (b3) the flow activation energy (Ea) is less than 50 kJ/mol.

In a second aspect, the present invention relates to a film obtained by extrusion-molding the above-described ethylene based polymer composition.

EMBODIMENTS FOR CARRYING OUT THE INVENTION

The component (A) ethylene based polymer includes an ethylene-α-olefin copolymer and a high pressure low density polyethylene. From the standpoint of enhancement of impact strength, an ethylene-α-olefin copolymer is preferable.

The component (A) ethylene-α-olefin copolymer is a copolymer containing a monomer unit based on ethylene and a monomer unit based on α-olefin. The α-olefin includes propylene, 1-butene, 1-pentene, 1-hexene, 1-heptene, 1-octene, 1-nonene, 1-decene, 1-dodecene, 4-methyl-1-pentene, 4-methyl-1-hexene and the like, and these may be used singly or in combination with another or more. The α-olefin is preferably an α-olefin having 3 to 20 carbon atoms, more preferably an α-olefin having 4 to 8 carbon atoms, further preferably at least one α-olefin selected from 1-butene, 1-hexene, 1-octene and 4-methyl-1-pentene.

The component (A) ethylene-α-olefin copolymer may also contain a monomer unit based on other monomer within the range not deteriorating the effect of the present invention, in addition to the above-described monomer unit based on ethylene and monomer unit based on α-olefin. Examples of the other monomer include conjugated dienes (for example, butadiene and isoprene), non-conjugated dienes (for example, 1,4-pentadiene), acrylic acid, acrylates (for example, methyl acrylate and ethyl acrylate), methacrylic acid, methacrylates (for example, methyl methacrylate and ethyl methacrylate), vinyl acetate and the like.

Examples of the component (A) ethylene-α-olefin copolymer include ethylene-1-butene copolymer, ethylene-1-hexene copolymer, ethylene-4-methyl-1-pentene copolymer, ethylene-1-octene copolymer, ethylene-1-butene-1-hexene copolymer, ethylene-1-butene-4-methyl-1-pentene copolymer, ethylene-1-butene-1-octene copolymer and the like. From the standpoint of enhancement of impact strength, preferable are copolymers having a monomer units based on ethylene and a monomer unit based on α-olefin having 6 to 8 carbon atoms, and specifically mentioned are ethylene-1-hexene copolymer, ethylene-1-octene copolymer, ethylene-1-butene-1-hexene copolymer, ethylene-1-butene-1-octene copolymer and the like.

In the component (A) ethylene-α-olefin copolymer, the content of the monomer unit based on ethylene is usually 80 to 98% by weight with respect to the total weight (100% by weight) of the ethylene-α-olefin copolymer, and the content of the monomer unit based on α-olefin is usually 2 to 20% by weight with respect to the total weight (100% by weight) of the ethylene based polymer.

The component (A) ethylene based polymer has a flow activation energy (Ea; unit is kJ/mol) of 50 kJ/mol or more. The Ea is preferably 55 kJ/mol or more, more preferably 60 kJ/mol or more, from the standpoint of enhancement of molding processability. From the standpoint of enhancement of impact strength, the Ea is preferably 100 kJ/mol or less, more preferably 90 kJ/mol or less.

The flow activation energy (Ea) is a numerical value calculated according to an Arrhenius type equation from a shift factor ($a_T$) in making a master curve showing the dependency of melt complex viscosity (unit: Pa·sec) at 190° C. on angular frequency (unit: rad/sec), based on the temperature-time superposition principle, and is a value obtained by a method described below. That is, melt complex viscosity-angular frequency curves of ethylene-α-olefin copolymer at four temperatures (T, unit: °C.) including 190°C. among temperatures of 130°C., 150°C., 170°C., 190°C. and 210°C. are superposed on a melt complex viscosity-angular frequency curve of the ethylene based copolymer at 190°C., for each melt complex viscosity-angular frequency curve at each temperature (T), based on the temperature-time superposition theory, thereby obtaining shift factors ($a_T$) at respective temperatures (T), and a primary approximation formula (the following formula (I)) of [ln($a_T$)] and [1/(T+273.16)] is calculated by a least square method from respective temperatures (T) and shift factors ($a_T$) at respective temperatures (T). Then, Ea is obtained from the inclination m of the primary formula and the following formula (II).

$$\ln(a_T) = m(1/(T+273.16)) + n \tag{I}$$

$$Ea = |0.008314 \times m| \tag{II}$$

$a_T$: shift factor
Ea: flow activation energy (unit: kJ/mol)
T: temperature (unit: °C.)

In the above-described calculation, a commercially available calculation software may be used, and the commercially available calculation software includes Rhios V.4.4.4 manufactured by Rheometrics, and the like.

The shift factor ($a_T$) is move amount when melt complex viscosity-angular frequency double logarithm curves at respective temperatures (T) are moved to log(Y)=–log(X) axis direction (here, Y axis represents melt complex viscosity, X axis represents angular frequency) and superposed on a melt complex viscosity-angular frequency curve at 190°C., and in this superposition, for the melt complex viscosity-angular frequency double logarithm curves at respective temperatures (T), the angular frequency is moved by $a_T$-fold and the melt complex viscosity is moved by 1/$a_T$-fold.

The correlation coefficient in obtaining a primary approximation formula (I) by a least square method obtained from shift factors at four temperatures including 190°C. among 130°C., 150°C., 170°C., 190°C. and 210°C. and from the temperatures is usually 0.99 or more.

Measurement of the above-described melt complex viscosity-angular frequency curve uses a viscoelasticity measuring apparatus (for example, Rheometrics Mechanical Spectrometer RMS-800 manufactured by Rheometrics, and the like), and usually carried out under conditions of geometry: parallel plate, plate diameter: 25 mm, plate interval: 1.2 to 2 mm, strain: 5%, and angular frequency: 0.1 to 100 rad/sec. The measurement is carried out under a nitrogen atmosphere, and it is preferable to previously blend a suitable amount (for example, 1000 ppm) of an antioxidant into the measurement sample.

The density (unit is kg/m$^3$) of the component (A) ethylene based polymer is 890 to 925 kg/m$^3$. The density is preferably 900 kg/m$^3$ or more, more preferably 905 kg/m$^3$ or more, further preferably 910 kg/m$^3$ or more, from the standpoint of enhancement of rigidity. From the standpoint of enhancement of impact strength, it is preferably 920 kg/m$^3$ or less.

The density is measured according to an underwater substitution method defined in JIS K7112-1980 after carrying out annealing described in JIS K6760-1995.

The melt flow rate (MFR; unit is g/10 minutes) of the component (A) ethylene based polymer is 0.1 to 10 g/10 minutes. The MFR is preferably 0.3 g/10 minutes or more, more preferably 0.5 g/10 minutes or more, from the standpoint of lowering of extrusion load in molding processing. From the standpoint of enhancement of molding processability and impact strength, it is preferably 8 g/10 minutes or less, more preferably 5 g/10 minutes or less. The melt flow rate is a value measured by a method A under conditions of a temperature of 190°C. and a load of 21.18 N according to a method defined in JIS K7210-1995.

The melt flow rate ratio (MFRR) of the component (A) ethylene based polymer is preferably 40 or more from the standpoint of enhancement of molding processability. From the standpoint of enhancement of impact strength, it is preferably 200 or less. This is a value obtained, by the following formula, from MFR measured by a method A under conditions of a temperature of 190°C. and a load of 21.18 N according to a method defined in JIS K7210-1995 and from melt flow rate (hereinafter, MFR-H (unit: g/10 minutes)) measured under conditions of a load of 211.82 N and a temperature of 190°C. according to a method defined in JIS K7210-1995.

MFRR=MFR-H/MFR

The molecular weight distribution (Mw/Mn) of the component (A) ethylene based polymer is preferably 3 or more, more preferably 5 or more, further preferably 6 or more from the standpoint of enhancement of molding processability. From the standpoint of enhancement of impact strength, it is preferably 25 or less, more preferably 20 or less, further preferably 15 or less. The molecular weight distribution (Mw/Mn) is a value (Mw/Mn) obtained by dividing the weight average molecular weight (Mw) by the number average molecular weight (Mn), and Mw and Mn are measured by a gel permeation chromatograph (GPC) method. The measuring conditions of the GPC method include, for example, the following conditions.

(1) Apparatus: Waters 150C manufactured by Waters
(2) Separation column: TOSOH TSkgel GMH6-HT
(3) Measuring temperature: 140°C.
(4) Carrier: ortho-dichlorobenzene
(5) Flow rate: 1.0 mL/min
(6) Injection volume: 500 μL
(7) Detector: differential refractometer
(8) Molecular weight reference material: standard polystyrene As the method for producing a component (A) ethylene-α-olefin copolymer, there is mentioned a method of copolymerizing ethylene and α-olefin with a metallocene catalyst using, as a catalyst component, a metallocene complex having a ligand containing two (substituted) indenyl groups connected via a cross-linking group such as an alkylene group, silylene group and the like, for example, ethylenebis(1-indenyl)zirconium diphenoxide.

In the metallocene catalyst, a co-catalyst component which activates a metallocene complex is used. The co-catalyst component includes organoaluminumoxy compounds, boron compounds, organozinc compounds and the like. It is preferable that these co-catalyst components are supported on a fine particle carrier and used.

As the fine particle carrier, porous substances are preferable, and used are inorganic oxides such as $SiO_2$, $Al_2O_3$, MgO, $ZrO_2$, $TiO_2$, $B_2O_3$, CaO, ZnO, BaO, $ThO_2$ and the like; clays and clay minerals such as smectite, montmorillonite, hectorite, laponite, saponite and the like; organic polymers such as polyethylene, polypropylene, styrene-divinylbenzene copolymer, and the like. The 50% volume average particle diameter of the fine particle carrier is usually 10 to 500 μm, and the 50% volume average particle diameter is measured by a light scattering mode laser diffraction method and the like. The pore volume of the fine particle carrier is usually 0.3 to 10 ml/g, and the pore volume is mainly measured by a gas adsorption method (BET method). The specific surface area of the fine particle carrier is usually 10 to 1000 m²/g, and the specific surface area is measured mainly by a gas adsorption method (BET method).

The method for producing a component (A) ethylene-α-olefin copolymer is not particularly restricted, and there is mentioned a method of copolymerizing ethylene and α-olefin in the presence of a polymerization catalyst obtained by contacting (A) the following co-catalyst carrier, (B) a metallocene complex having a ligand containing two (substituted) indenyl groups connected via a cross-linking group such as an alkylene group, silylene group and the like and (C) an organoaluminum compound.

The above-described co-catalyst carrier (A) is a carrier obtained by contacting a component (a) diethylzinc, a component (b) two fluorinated phenols, a component (c) water, a component (d) inorganic fine particle carrier and a component (e) 1,1,1,3,3,3-hexamethyldisilazane (($CH_3$)$_3$Si)$_2$NH).

The component (b) fluorinated phenol includes pentafluorophenol, 3,5-difluorophenol, 3,4,5-trifluorophenol, 2,4,6-trifluorophenol and the like. From the standpoint of enhancement of the flow activation energy (Ea) of the component (A) ethylene-α-olefin copolymer, it is preferable to use two fluorinated phenols having different fluorine numbers, and for example, mentioned are combinations of pentafluorophenol/3,4,5-trifluorophenol, pentafluorophenol/2,4,6-trifluorophenol, pentafluorophenol/3,5-difluorophenol and the like, and preferable is a combination of pentafluorophenol/3,4,5-trifluorophenol. The molar ratio of a fluorinated phenol having large fluorine number to a fluorinated phenol having small fluorine number is usually 20/80 to 80/20. From the standpoint of enhancement of the flow activation energy (Ea) of the component (A) ethylene-α-olefin copolymer, the above-described molar ratio is preferably larger and 50/50 or more is preferable.

The component (d) inorganic compound particle is preferably silica gel.

The use amounts of the component (a) diethylzinc, component (b) two fluorinated phenols and component (c) water are not particularly restricted, and if the molar ratio of the components is represented by component (a) diethylzinc:component (b) two fluorinated phenols:component (c)=1:x:y, it is preferable that x and y satisfy the following formula.

$$|2-x-2y| \leq 1$$

x in the above-described formula is preferably a number of 0.01 to 1.99, more preferably a number of 0.10 to 1.80, further preferably a number of 0.20 to 1.50, and most preferably a number of 0.30 to 1.00.

Regarding the amount of the component (d) inorganic fine particle carrier used against the component (a) diethylzinc, the amount of zinc atoms ascribable to the component (a) diethylzinc contained in a particles obtained by contact between the component (a) diethylzinc and the component (d) inorganic fine particle carrier is preferably 0.1 mmol or more, more preferably 0.5 to 20 mmol with respect to the mol number of zinc atoms contained in 1 g of the resultant particle. Regarding the amount of the component (e) trimethyldisilazane used against the component (d) inorganic fine particle carrier, the amount of the component (e) trimethyldisilazane is preferably 0.1 mmol or more, more preferably 0.5 to 20 mmol with respect to 1 g of the component (d) inorganic fine particle carrier.

As the metallocene complex (B) having a ligand containing two (substituted) indenyl groups connected via a cross-linking group such as an alkylene group, silylene group and the like, preferably mentioned is ethylenebis(1-indenyl)zirconium diphenoxide.

The organoaluminum compound (C) includes preferably triisobutylaluminum and tri-n-octylaluminum.

The use amount of the matellocene complex (B) is preferably $5 \times 10^{-6}$ to $5 \times 10^{-4}$ mol with respect to 1 g of the co-catalyst carrier (A). Regarding the use amount of the organoaluminum compound (C), the ratio (Al/M) of the mol number of aluminum atom in the organoaluminum compound (C) to the mol number of metal atom in the matellocene complex (B) is preferably 1 to 2000.

As the polymerization catalyst obtained by contacting the above-described co-catalyst carrier (A), matellocene complex (B) and organoaluminum compound (C), if necessary, a polymerization catalyst may also be permissible obtained by contacting an electron donating compound (D) to the co-catalyst carrier (A), matellocene complex (B) and organoaluminum compound (C). The electron donating compound (D) preferably includes triethylamine and tri-n-octylamine.

From the standpoint of increasing the molecular weight distribution of the component (A) ethylene-α-olefin copolymer, the electron donating compound (D) is preferably used, and the use amount of the electron donating compound (D) is more preferably 0.1 mol % or more, further preferably 1 mol % or more with respect to the mol number of aluminum atom in the organoaluminum compound (C). From the standpoint of enhancement of polymerization activity, the use amount is preferably 10 mol % or less, more preferably 5 mol % or less.

As the method of producing a component (A) ethylene-α-olefin copolymer, preferable is a method of copolymerizing ethylene and α-olefin using, as a catalyst component or catalyst, a pre-polymerized solid component obtained by polymerizing a small amount of olefin (hereinafter, referred to as pre-polymerization) using a solid catalyst component containing a catalyst component supported on a fine particle carrier, for example, a pre-polymerized solid component obtained by polymerizing a small amount of olefin using a co-catalyst carrier, metallocene complex and other co-catalyst component (alkylating agent such as organoaluminum compound, and the like).

The olefin to be used in the pre-polymerization includes ethylene, propylene, 1-butene, 1-pentene, 1-hexene, 1-octene, 4-methyl-1-pentene, cyclopentene, cyclohexene and the like. These may be used singly or in combination with another or more. The content of a polymer pre-polymerized in the pre-polymerized solid component is usually 0.1 to 500 g, preferably 1 to 200 g with respect to 1 g of the solid catalyst component.

The pre-polymerization method may be continuous or batch-wise, and examples thereof include a batch-wise slurry polymerization method, continuous slurry polymerization method and continuous gas phase polymerization method. As the method for charging catalyst components such as a co-catalyst carrier, metallocene complex and other co-catalyst component (alkylating agent such as organoaluminum compound, and the like) into a polymerization reaction tank for pre-polymerization, there are usually used a method in which they are charged under condition of no water using an inert gas such as nitrogen, argon and the like, and hydrogen, ethylene or the like, and a method in which components are dissolved or diluted in a solvent, and charged in the form of solution or slurry. The polymerization temperature in the pre-polymerization is usually lower than the melting point of the polymer pre-polymerized, and preferably 0 to 100° C., more preferably 10 to 70° C.

In the case of carrying out the pre-polymerization according to a slurry polymerization method, the solvent includes hydrocarbons having 20 or less carbon atoms. Examples thereof include saturated aliphatic hydrocarbons such as propane, n-butane, isobutane, n-pentane, isopentane, n-hexane, cyclohexane, heptanes, octane, decane and the like; and aromatic hydrocarbons such as benzene, toluene, xylene and the like, and these are used singly or in combination with another or more.

As the method of producing a component (A) ethylene-α-olefin copolymer, preferable is a continuous polymerization method including formation of particles of an ethylene-α-olefin copolymer, and examples thereof include a continuous gas phase polymerization method, continuous slurry polymerization method and continuous bulk polymerization method, and preferable is a continuous gas phase polymerization method. The gas phase polymerization reaction apparatus used for this polymerization method is usually an apparatus having a fluidized bed type reaction tank, and preferably an apparatus having a fluidized bed type reaction tank having an enlarged portion. A stirring blade may be set in the reaction tank.

As the method for charging the pre-polymerized solid component which has been pre-polymerized into a continuous polymerization reaction tank including formation of particles of an ethylene-α-olefin copolymer, there are usually used a method in which they are supplied under condition of no water using an inert gas such as nitrogen, argon and the like, and hydrogen, ethylene or the like, and a method in which components are dissolved or diluted in a solvent, and supplied in the form of solution or slurry.

The component (A) high pressure low density polyethylene is produced by polymerizing ethylene under conditions usually including a polymerization pressure of 100 to 300 MPa and a polymerization temperature of 130 to 300° C. using, as a polymerization initiator, a free radical generator such as an organic peroxide, oxygen and the like using, in general, a tank type reactor or tube type reactor. It is also possible to regulate MFR by using hydrogen or a hydrocarbon such as methane, ethane and the like as a molecular weight regulator.

The component (B) ethylene-α-olefin copolymer is a copolymer containing a monomer unit based on ethylene and a monomer unit based on α-olefin. The α-olefin includes propylene, 1-butene, 1-pentene, 1-hexene, 1-heptene, 1-octene, 1-nonene, 1-decene, 1-dodecene, 4-methyl-1-pentene, 4-methyl-1-hexene and the like, and these may be used singly or in combination with another or more. The α-olefin is preferably an α-olefin having 3 to 20 carbon atoms, more preferably an α-olefin having 4 to 8 carbon atoms, further preferably at least one α-olefin selected from 1-butene, 1-hexene, and 4-methyl-1-pentene.

The component (B) ethylene-α-olefin copolymer may also contain a monomer unit based on other monomer within the range not deteriorating the effect of the present invention, in addition to the above-described monomer unit based on ethylene and monomer unit based on α-olefin. Examples of the other monomer include conjugated dienes (for example, butadiene and isoprene), non-conjugated dienes (for example, 1,4-pentadiene), acrylic acid, acrylates (for example, methyl acrylate and ethyl acrylate), methacrylic acid, methacrylates (for example, methyl methacrylate and ethyl methacrylate), vinyl acetate and the like.

Examples of the component (B) ethylene-α-olefin copolymer include ethylene-1-butene copolymer, ethylene-1-hexene copolymer, ethylene-4-methyl-1-pentene copolymer, ethylene-1-octene copolymer, ethylene-1-butene1-hexene copolymer, ethylene-1-butene-4-methyl-1-pentene copolymer, ethylene-1-butene-1-octene copolymer and the like. Preferable are ethylene-1-butene copolymer, ethylene-1-hexene copolymer, ethylene-4-methyl-1-pentene copolymer and ethylene-1-butene-1-hexene copolymer.

In the component (B) ethylene-α-olefin copolymer, the content of the monomer unit based on ethylene is usually 50 to 99.5% by weight, preferably 80 to 99% by weight with respect to the total weight (100% by weight) of the ethylene-α-olefin copolymer. The content of the monomer unit based on α-olefin is usually 0.5 to 50% by weight, preferably 1 to 20% by weight with respect to the total weight (100% by weight) of the ethylene based polymer.

The density (unit is kg/m$^3$) of the component (B) ethylene-α-olefin copolymer is 890 to 925 kg/m$^3$. The density is preferably 890 kg/m$^3$ or more, more preferably 900 kg/m$^3$ or more, from the standpoint of enhancement of rigidity. From the standpoint of enhancement of impact strength, it is preferably 920 kg/m$^3$ or less, more preferably 915 kg/m$^3$ or less. The density is measured according to an underwater substitution method defined in JIS K7112-1980 after carrying out annealing described in JIS K6760-1995.

The intrinsic viscosity ([η]; unit is dL/g) of the component (B) ethylene-α-olefin copolymer in a tetralin solution is 4 to 15 g/10 minutes. The [η] is preferably 5 dL/g or more, more preferably 6 dL/g or more, from the standpoint of enhancement of impact strength. From the standpoint of lowering of extrusion load in molding processing, it is preferably 13 dL/g or less, more preferably 11 dL/g or less. The [η] is obtained as described below: a tetralin solution containing 2,6-di-t-butyl-p-cresol (BHT) dissolved at a concentration of 0.5 g/L (hereinafter, described as blank solution) and a solution containing a polymer dissolved in the blank solution at a concentration of 1 mg/ml (hereinafter, described as sample solution) are prepared, then, the descendent times of the blank solution and the sample solution at 135° C. are measured by an Ubbelohde viscometer, and the [η] is obtained from the descendent times according to the following formula.

$$[\eta]=23.3\times\log(\eta rel)$$

ηrel=descendent time of sample solution/descendent time of blank solution

The component (B) ethylene-α-olefin copolymer has a flow activation energy (Ea; unit is kJ/mol) of less than 50 kJ/mol. The Ea is preferably 40 kJ/mol or less, more preferably 35 kJ/mol or less, from the standpoint of enhancement of impact strength. The Ea is measured by the above-described method.

The component (B) ethylene-α-olefin copolymer is produced by copolymerizing ethylene and α-olefin by a known polymerization method such as a liquid phase polymerization method, slurry polymerization method, gas phase polymerization method, high pressure ion polymerization method and the like using a known olefin polymerization catalyst such as Ziegler catalysts, metallocene catalysts (preferably, catalysts using metallocene complexes having a ligand containing a (substituted) cyclopentadienyl group and a (substituted) fluorenyl group connected via a cross-linking group such as an alkylene group, silylene group and the like) and the like. These polymerization methods may be batch-wise or continuous. Furthermore, commercially available correspondent products may also be used.

The ethylene based polymer composition of the present invention contains a component (A) and a component (B). The content of the component (B) is 0.5 to 20 parts by weight with respect to 100 parts by weight of the component (A). The content of the component (B) is preferably 1 part by weight or more with respect to 100 parts by weight of the component (A), from the standpoint of enhancement of impact strength. The content of the component (B) is preferably 15 parts by weight or less, more preferably 10 parts by weight or less with respect to 100 parts by weight of the component (A) from the standpoint of lowering of extrusion load in molding processing.

The ethylene based polymer composition of the present invention may contain known additives, if necessary. Examples of the additive include an antioxidant, weatherproofing agent, lubricant, anti-blocking agent, antistatic agent, anti-fogging agent, dropless agent, pigment, filler and the like.

The method of producing an ethylene based polymer composition of the present invention includes a method in which a component (A) and a component (B) are produced separately, then, mixed, a method in which a composition of a component (A) and a component (B) is produced by a polymerization reaction, and other methods.

As the method in which a component (A) and a component (B) are produced separately, then, mixed, there are mentioned a method of performing a melt kneading treatment by an extruder such as (1) an extruder equipped with an elongation flow kneading die (for example, die described in U.S. Pat. No. 5,451,106 developed by Utracki, et al., and the like), (2) an extruder equipped with an counter-rotating twin screw having a gear pump (preferably, having a retention part between a screw part and die), or the like, a method in which a solvent such as ortho-dichlorobenzene, xylene or the like is heated up to a temperature at which the resin is dissolved, the solution is mixed, then, precipitation is caused with a poor solvent such as ethanol and the like, and the precipitate is recovered, and other method.

As the method of producing a composition of a component (A) and a component (B) by polymerization, there are mentioned methods of polymerizing using two olefin polymerization catalysts, for example, a method of polymerizing using a Ziegler catalyst and a metallocene catalyst in combination, and methods of polymerizing using two metallocene complexes. Further mentioned are multi-stage polymerization methods, for example, a method in which a component (B) is produced in former stage polymerization and a component (A) is produced in latter stage polymerization.

The ethylene based polymer composition of the present invention is molded into a film, sheet, bottle, tray and the like by known molding methods, for example, extrusion molding methods such as an blown film molding method, flat die film molding method and the like, hollow molding methods, injection molding methods, compression molding methods and the like. As the molding method, extrusion molding methods (particularly, blown film molding method) and hollow molding method are suitably used. It is suitable that the ethylene based polymer composition of the present invention is molded into a film or bottle and used.

The ethylene based polymer composition of the present invention is excellent in impact strength, and a molded article obtained by molding the ethylene based polymer composition is used in various applications such as food wrapping, surface protection and the like.

The present invention will be illustrated by examples and comparative examples below.

Physical properties in examples and comparative examples were measured according to the following methods.
(1) Density (unit: kg/m³)

The density was measured according to an underwater substitution method defined in JIS K7112-1980. A sample was subjected to annealing described in JIS K6760-1995.
(2) Melt flow rate (MFR, unit: g/10 minutes)

The melt flow rate was measured by a method A under conditions of a load of 21.18 N and a temperature of 190° C. according to a method defined in JIS K7210-1995.
(3) Melt Flow Rate Ratio (MFRR)

The melt flow rate (hereinafter, MFR-H (unit: g/10 minutes)) was measured under conditions of a load of 211.82 N and a temperature of 190° C. according to a method defined in JIS K7210-1995. MFRR was obtained by the following formula from MFR and MFR-H.

MFRR=MFR-H/MFR (4) Intrinsic Viscosity ([η], unit: dL/g)

A tetralin solution containing 2,6-di-t-butyl-p-cresol (BHT) dissolved at a concentration of 0.5 g/L (hereinafter, described as blank solution) and a solution containing a polymer dissolved in the blank solution at a concentration of 1 mg/ml (hereinafter, described as sample solution) were prepared. The descendent times of the blank solution and the sample solution at 135° C. were measured by an Ubbelohde viscometer, and the [η] was obtained from the descendent times according to the following formula.

[η]=23.3×log(ηrel)

ηrel=descendent time of sample solution/descendent time of blank solution
(5) Flow Activation Energy (Ea, unit: kJ/mol), characteristic relaxation time (τ, unit: second)

The melt complex viscosity-angular frequency curves were measured at 130° C., 150° C., 170° C. and 190° C. under the following conditions using a viscoelasticity measuring apparatus (Rheometrics Mechanical Spectrometer RMS-800 manufactured by Rheometrics, and the like).

Next, a master curve of the melt complex viscosity-angular frequency curve at 190° C. was made using a calculation software Rhios V.4.4.4 available from Rheometrics from the resultant melt complex viscosity-angular frequency curves, and the flow activation energy (Ea) and characteristic relaxation time (τ) were obtained.

<Measurement Conditions>
Geometry: parallel plate
Plate diameter: 25 mm
Plate interval: 1.5 to 2 mm
Strain: 5%
Angular frequency: 0.1 to 100 rad/sec
Measurement atmosphere: nitrogen
(6) Molecular Weight Distribution (Mw/Mn)

The weight average molecular weight (Mw) and the number average molecular weight (Mn) were measured under the following conditions (1) to (8) using a gel permeation chromatograph (GPC) method, and the molecular weight distribution (Mw/Mn) was obtained. The base line on the chromatogram was a straight line obtained by connecting a point in stable horizontal region of sufficiently shorter retention time than emergence of sample elution peak and a point in stable horizontal region of sufficiently longer retention time than observance of sample elution peak.

(1) Apparatus: Waters 150C manufactured by Waters
(2) Separation column: two pieces of TOSOH TSkgel GMH6-HT
(3) Measuring temperature: 140° C.
(4) Carrier: ortho-dichlorobenzene
(5) Flow rate: 1.0 mL/min
(6) Injection volume: 500 μL
(7) Detector: differential refractometer
(8) Molecular weight reference material: standard polystyrene (7) Molding Processability The width of bubble vibration in inflation film molding was observed, and evaluated according to the following standard.

Larger the number, more excellent molding processability.
4: bubble vibration width is very narrow
3: bubble vibration width is narrow
2: bubble vibration width is somewhat broad
1: bubble vibration width is broad (8) Impact Strength of Film A film impact tester equipped with a constant temperature tank (manufactured by Toyo Seiki Seisaku-sho Ltd.) was used, the penetration portion at the peak of pendulum was made into half sphere of 15 mm $\phi$ and the effective test piece area was 50 mm $\phi$ circle, and the impact piercing strength of the film was measured at 23° C.

Example 1

(1) Preparation of Component (A)

(1-1) Preparation of Co-Catalyst Carrier

A reaction vessel equipped with a stirrer was purged with nitrogen, and 2.8 kg of silica (Sylopol 948 manufactured by Davison Corp; 50% volume average particle diameter=55 μm; pore volume=1.67 ml/g; specific surface area=325 m$^2$/g) treated by heating at 300° C. under nitrogen flow and 24 kg of toluene were placed therein, and stirred. Thereafter, the mixture was cooled down to 5° C., then, a mixed solution composed of 0.91 kg of 1,1,1,3,3,3-hexamethyldisilazane and 1.43 kg of toluene was dropped over a period of 33 minutes while keeping the temperature in the reaction vessel at 5° C. After completion of dropping, the mixture was stirred at 5° C. for 1 hour, then, heated up to 95° C., and stirred at 95° C. for 3 hours, and filtrated. The resultant solid component was washed with 21 kg of toluene six times. Thereafter, 6.9 kg of toluene was added to give a slurry which was then allowed to stand still overnight.

To the slurry obtained above, 2.05 kg of a hexane solution of diethylzinc (diethylzinc concentration: 50% by weight) and 1.3 kg of hexane were added, and stirred. Thereafter, the mixture was cooled to 5° C., and a mixed solution composed of 0.77 kg of pentafluorophenol and 1.17 kg of toluene was dropped over a period of 61 minutes while keeping the temperature in the reaction vessel at 5° C. After completion of dropping, the mixture was stirred at 5° C. for 1 hour, then, heated up to 40° C. and stirred at 40° C. for 1 hour. Thereafter, the mixture was cooled down to 5° C., and 0.11 kg of H$_2$O was dropped over 1.5 hours while keeping the temperature in the reaction vessel at 5° C. After completion of dropping, the mixture was stirred at 5° C. for 1.5 hours, then, heated up to 55° C. and stirred at 55° C. for 2 hours. Thereafter, 1.4 kg of a hexane solution of diethylzinc (diethylzinc concentration: 50% by weight) and 0.8 kg of hexane were added. The mixture was cooled down to 5° C., then, a mixed solution composed of 0.42 kg of 3,4,5-trifluorophenol and 0.77 kg of toluene was dropped over a period of 60 minutes while keeping the temperature in the reaction vessel at 5° C. After completion of dropping, the mixture was stirred at 5° C. for 1 hour, then, heated up to 40° C., and stirred at 40° C. for 1 hour. Thereafter, the mixture was cooled down to 5° C., and 0.077 kg of H$_2$O was dropped over 1.5 hours while keeping the temperature in the reaction vessel at 5° C. After completion of dropping, the mixture was stirred at 5° C. for 1.5 hours, then, heated up to 40° C. and stirred at 40° C. for 2 hours, and further, heated up to 80° C. and stirred at 80° C. for 2 hours. After stirring, the supernatant was extracted out until a residual amount of 16 L, and 11.6 kg of toluene was added and the mixture was heated up to 95° C. and stirred for 4 hours. After stirring, the supernatant was extracted out to obtain a solid component. The resultant solid component was washed with 20.8 kg of toluene four times and with 24 liter of hexane three times. Thereafter, drying was performed to obtain a solid component (hereinafter, described as co-catalyst carrier).

(1-2) Preparation of Pre-Polymerized Catalyst

Into a reaction vessel equipped with stirrer having an internal content of 210 liter which had been previously purged with nitrogen, 80 liter of butane was added at normal temperature, then, 73 mmol of racemic-ethylenebis(1-indenyl) zirconium diphenoxide was added. Thereafter, the temperature in the reaction vessel was raised up to 50° C., and the mixture was stirred for 2 hours. The temperature in the reaction vessel was lowered to 30° C., and 0.1 kg of ethylene was added. Next, 661 g of the co-catalyst carrier prepared in (1-1) was added. Thereafter, hydrogen in an amount of 0.1 liter was added at normal temperature and normal pressure. After stabilization in the system, 105 mmol of triisobutylaluminum was added, and pre-polymerization was initiated. Until 0.5 hours after initiation of pre-polymerization, the temperature in the reaction vessel was kept at 30° C. Thereafter, the temperature in the reaction vessel was heated up to 50° C. over a period of 30 minutes, and after this, kept at 50° C. Until 0.5 hours after initiation of pre-polymerization, ethylene was fed at a rate of 0.7 kg/hour, and hydrogen was fed at a rate of 1.1 liter/hour at normal temperature and normal pressure. From 0.5 hours after initiation of pre-polymerization, ethylene was fed at a rate of 3.5 kg/hour, and hydrogen was fed at a rate of 10.2 liter/hour at normal temperature and normal pressure. Pre-polymerization of 4 hours in total was carried out. After completion of pre-polymerization, the pressure in the reaction vessel was purged to 0.5 MPa, and a pre-polymerized catalyst component in the form of slurry was transferred to a drying vessel, and drying under nitrogen flow was carried out to obtain a pre-polymerized catalyst component. The pre-polymerization amount of an ethylene polymer in the pre-polymerized catalyst component was 18.2 g per 1 g of the co-catalyst carrier.

(1-3) Copolymerization of Ethylene, 1-butene and 1-hexene

Using a continuous mode fluidized bed gas phase polymerization apparatus, ethylene, 1-butene and 1-hexene were copolymerized. The polymerization temperature was 85° C., the polymerization pressure was 2.0 MPa, the molar ratio of hydrogen to ethylene was 2.1%, and, the molar ratio of 1-butene was 2.1% and the molar ratio of 1-hexene was 0.6%, with respect to the total amount of ethylene, 1-butene and 1-hexene. During polymerization, ethylene, 1-butene, 1-hexene and hydrogen were fed continuously for keeping the gas composition constant. Further, the above-described pre-polymerized catalyst component, triisobutylaluminum and triethylamine (molar ratio to triisobutylaluminum was 3%) were continuously fed. The average polymerization time was 4 hours. The resultant ethylene-1-butene-1-hexene copolymer powder was granulated using an extruder (LCM 50 manufactured by Kobe Steel Ltd.) under conditions of a feeding speed of 50 kg/hr, a screw revolution of 450 rpm, a gate opening of 50%, a suction pressure of 0.1 MPa and a resin temperature of 200 to 230° C., to obtain an ethylene-1-butene-1-hexene copolymer (hereinafter, described as A1). The physical property values of the polymer A1 are shown in Table 1.

(2) Preparation of Component (B)

(2-1) Preparation of Solid Catalyst Component

Into a nitrogen purged 200 L reaction vessel equipped with a stirrer and a baffle plate was placed 80 L of hexane, 20.6 kg of tetraethoxysilane and 2.2 kg of tetrabutoxytitanium, and the mixture was stirred. Next, into the above-described stirred mixture, 50 L of a dibutyl ether solution of butyl magnesium chloride (concentration: 2.1 mol/L) was dropped over 4 hours while maintaining the temperature of the reaction vessel at 5° C. After completion of dropping, the mixture was stirred at 5° C. for 1 hour, further at 20° C. for 1 hour, and filtrated to obtain a solid component. Next, the resultant solid component was washed with 70 L of toluene three times, and 63 L of toluene was added to the solid component, obtaining a slurry.

A reaction vessel having an inner volume of 210 L equipped with a stirrer was purged with nitrogen, and the toluene slurry of the solid component was charged in the reaction vessel, and 14.4 kg of tetrachlorosilane and 9.5 kg of di(2-ethylhexyl)phthalate were added, and the mixture was stirred at 105° C. for 2 hours. Then, solid-liquid separation was performed, and the resultant solid was washed with 90 L of toluene three times at 95° C. 63 L of toluene was added to the solid, the temperature was raised to 70° C., 13.0 kg of $TiCl_4$ was added and the mixture was stirred at 105° C. for 2 hours. Then, solid-liquid separation was performed, and the resultant solid was washed with 90 L of toluene six times at 95° C., further, washed with 90 L of hexane twice at room temperature. The solid after washing was dried, to obtain a solid catalyst component.

(2-2) Copolymerization of Ethylene and 1-butene

An autoclave having an inner volume of 3 L equipped with a stirrer was dried sufficiently, the autoclave was evaluated, and 500 g of butane and 250 g of 1-butene were charged and the mixture was heated at 70° C. Next, ethylene was added at a partial pressure of 1.0 MPa. 5.7 mmol of triethylaluminum and 10.7 mg of the solid catalyst component were pressed in by argon, and polymerization thereof was initiated. Ethylene was fed continuously to give constant pressure, and polymerization was carried out at 70° C. for 180 minutes. By the polymerization, an ethylene-1-butene copolymer (hereinafter, described as B1) was obtained. The physical property values of the polymer B1 are shown in Table 1.

(3) Preparation of Ethylene Based Polymer Composition

A mixture prepared by mixing 99 parts by weight of the polymer A1, 1 part by weight of the polymer B1, and 2,6-di-t-butyl-p-cresol (BHT) in an amount of 1 part by weight with respect to 100 parts by weight of the total weight of (A1) and (B1) (the polymer (B1) is 1 part by weight per 100 parts by weight of the polymer (A1)) was dissolved in xylene of 120° C. so the total concentration of the polymer (A1) and the polymer (B1) was 2% by weight, and the mixture was stirred for 1.5 hours. Next, the xylene solution was dropped into methanol, to obtain a precipitate. This precipitate is an ethylene based polymer composition.

(4) Film Processing

Into the ethylene based polymer composition, 1000 ppm of an antioxidant (manufactured by Sumitomo Chemical Co., Ltd., Sumilizer GP) and 800 ppm of calcium stearate were blended, next, the ethylene based polymer composition was processed by an blown film molding machine (manufactured by RandCastle, single screw extruder (diameter: 0.5 inch φ), dice (die diameter: 0.625 inch φ, lip gap: 0.03 inch)) under processing conditions of a processing temperature of 200° C., an extrusion amount of 170 g/hr, a frost line height of 20 mm, a blow ratio of 2.0 and a film drawing speed of 2.0 m/min, to mold a blown film having a thickness of 20 μm. The results of evaluation of the stability of bubble in film molding and the physical properties of the resultant film are shown in Table 2.

Example 2

(1) Preparation of Component (B2)

After drying under reduced pressure, an atmosphere in a 5 liter autoclave equipped with a stirrer which had been purged with argon was made vacuum, and hydrogen was added to give a partial pressure thereof of 0.037 MPa, and 800 g of 1-butene and 400 g of butane were charged, and the temperature in the system was raised up to 70° C., then, ethylene was introduced to give a partial pressure thereof of 1.6 MPa, to stabilize the system. As a result of gas chromatography, the gas composition in the system was hydrogen=1.8 mol %. To this was added 9.5 mL of a hexane solution of triethylaluminum having a triethylaluminum concentration of 1 mmol/mL. Next, the solid catalyst component obtained in (1-2) of Example 1 was added in an amount of 21.3 mg and polymerization was initiated. During polymerization, polymerization at 70° C. was carried out for 60 minutes while continuously feeding an ethylene/hydrogen mixed gas (hydrogen=0.67 mol %) so as to keep the total pressure and hydrogen concentration in the gas constant. Thereafter, butane, 1-butene, ethylene and hydrogen were purged, to obtain 184 g of an ethylene-1-butene copolymer (hereinafter, described as (B2)). The physical property values of the polymer (B2) are shown in Table 1.

(2) Preparation of Ethylene Based Polymer Composition

A mixture prepared by mixing 95 parts by weight of the polymer (A1) obtained in Example 1, 5 parts by weight of the polymer (B2), and 2,6-di-t-butyl-p-cresol (BHT) in an amount of 1 part by weight with respect to 100 parts by weight of the total weight of (A1) and (B1) (the polymer (B2) is 5.3 parts by weight per 100 parts by weight of the polymer (A1)) was dissolved in xylene of 120° C. so the total concentration of the polymer (A1) and the polymer (B2) was 2% by weight, and the mixture was stirred for 1.5 hours. Next, the xylene solution was dropped into methanol, to obtain a precipitate. This precipitate is an ethylene based polymer composition.

(3) Film Processing

Into the ethylene based polymer composition, 1000 ppm of an antioxidant (manufactured by Sumitomo Chemical Co., Ltd., Sumilizer GP) and 800 ppm of calcium stearate were blended, then, the ethylene based polymer composition was molded into a blown film having a thickness of 20 μm by a blown film molding machine (manufactured by RandCastle, single screw extruder (diameter: 0.5 inch φ), dice (die diameter: 0.625 inch φ, lip gap: 0.03 inch)) under processing conditions of a processing temperature of 200° C., an extrusion amount of 170 g/hr, a frost line height of 20 mm, a blow ratio of 2.0 and a film drawing speed of 2.0 m/min. The results of evaluation of the stability of bubble in film molding and the physical properties of the resultant film are shown in Table 2.

Comparative Example 1

Into the polymer A1, 1000 ppm of an antioxidant (manufactured by Sumitomo Chemical Co., Ltd., Sumilizer GP) and 800 ppm of calcium stearate were blended, and the blend was molded into a blown film having a thickness of 20 μm in the same manner as for the film processing of Example 1. The results of evaluation of the stability of bubble in film molding and the physical properties of the resultant film are shown in Table 2.

Comparative Example 2

(1) Preparation of Ethylene Based Polymer Composition

A mixture prepared by mixing 95 parts by weight of the polymer (A1) obtained in Example 1, 5 parts by weight of a commercially available ultrahigh molecular weight high density polyethylene (B3: manufactured by Mitsui Chemicals, Hizex Million 145M), and 2,6-di-t-butyl-p-cresol (BHT) in an amount of 1 part by weight with respect to 100 parts by weight of the total weight of (A1) and (B3) (the polymer (B3) is 5.3 parts by weight per 100 parts by weight of the polymer (A1)) was dissolved in xylene of 120° C. so the total concentration of the polymer (A1) and the polymer (B3) was 2% by weight, and the mixture was stirred for 1.5 hours. Next, the xylene solution was dropped into methanol, to obtain a precipitate. This precipitate is an ethylene based polymer composition.

(2) Film Processing

Into the ethylene based polymer composition, 1000 ppm of an antioxidant (manufactured by Sumitomo Chemical Co., Ltd., Sumilizer GP) and 800 ppm of calcium stearate were blended, then, the ethylene based polymer composition was molded into a blown film having a thickness of 20 μm by a blown film molding machine (manufactured by RandCastle, single screw extruder (diameter: 0.5 inch φ), dice (die diameter: 0.625 inch φ, lip gap: 0.03 inch)) under processing conditions of a processing temperature of 200° C., an extrusion amount of 170 g/hr, a frost line height of 20 mm, a blow ratio of 2.0 and a film drawing speed of 2.0 m/min. The results of evaluation of the stability of bubble in film molding and the physical properties of the resultant film are shown in Table 2.

TABLE 1

| polymer | density (kg/m$^3$) | MFR (g/10 min) | MFRR | [η] (dL/g) | Ea (kJ/mol) | Mw/Mn |
|---|---|---|---|---|---|---|
| A1 | 920 | 2 | 63 | — | 71 | 8.6 |
| B1 | 910 | <0.01 | — | 9.1 | 25 | 15 |
| B2 | 914 | <0.01 | — | 4.1 | 33 | 4.1 |
| B3 | 933 | <0.01 | — | 7.7 | — | 5.1 |

TABLE 2

| | | Example 1 | Example 2 | Comparative Example 1 | Comparative Example 2 |
|---|---|---|---|---|---|
| Polymer composition | | | | | |
| A1 | Parts by weight | 99 | 95 | 100 | 95 |
| B1 | | 1 | — | — | — |
| B2 | | — | 5 | — | — |
| B3 | | — | — | — | 5 |
| Film physical properties | | | | | |
| Bubble stability | | 4 | 4 | 4 | 4 |
| Impact piercing strength (kg · cm/mm) | | 103 | 165 | 81 | 63 |

INDUSTRIAL APPLICABILITY

According to the present invention, an ethylene based polymer composition excellent in strength and moldability, and a film obtained by extrusion-molding the polymer composition, can be provided.

The invention claimed is:

1. An ethylene based polymer composition comprising the following component (A) and the following component (B) wherein the content of the component (B) is 0.5 to 20 parts by weight per 100 parts by weight of the component (A):
   Component (A): an ethylene based polymer satisfying all of the following requirements (a1) to (a3):
   (a1) the density is 890 to 925 kg/m$^3$,
   (a2) the melt flow rate (MFR) is 0.1 to 10 g/10 minutes,
   (a3) the flow activation energy (Ea) is 50 kJ/mol or more,
   Component (B): an ethylene-a-olefin copolymer satisfying all of the following requirements (b1) to (b3):
   (b1) the density is 890 to 925 kg/m$^3$,
   (b2) the intrinsic viscosity [η] measured in a tetralin solution is 5 to 15 dL/g,
   (b3) the flow activation energy (Ea) is less than 50 kJ/mol.

2. A film obtained by extrusion-molding the ethylene based polymer composition as described in claim 1.

* * * * *